Sept. 4, 1951 J. P. BUTTERFIELD 2,567,144
SUSPENSION FOR STEERABLE WHEELS
Filed March 1, 1947 2 Sheets-Sheet 2
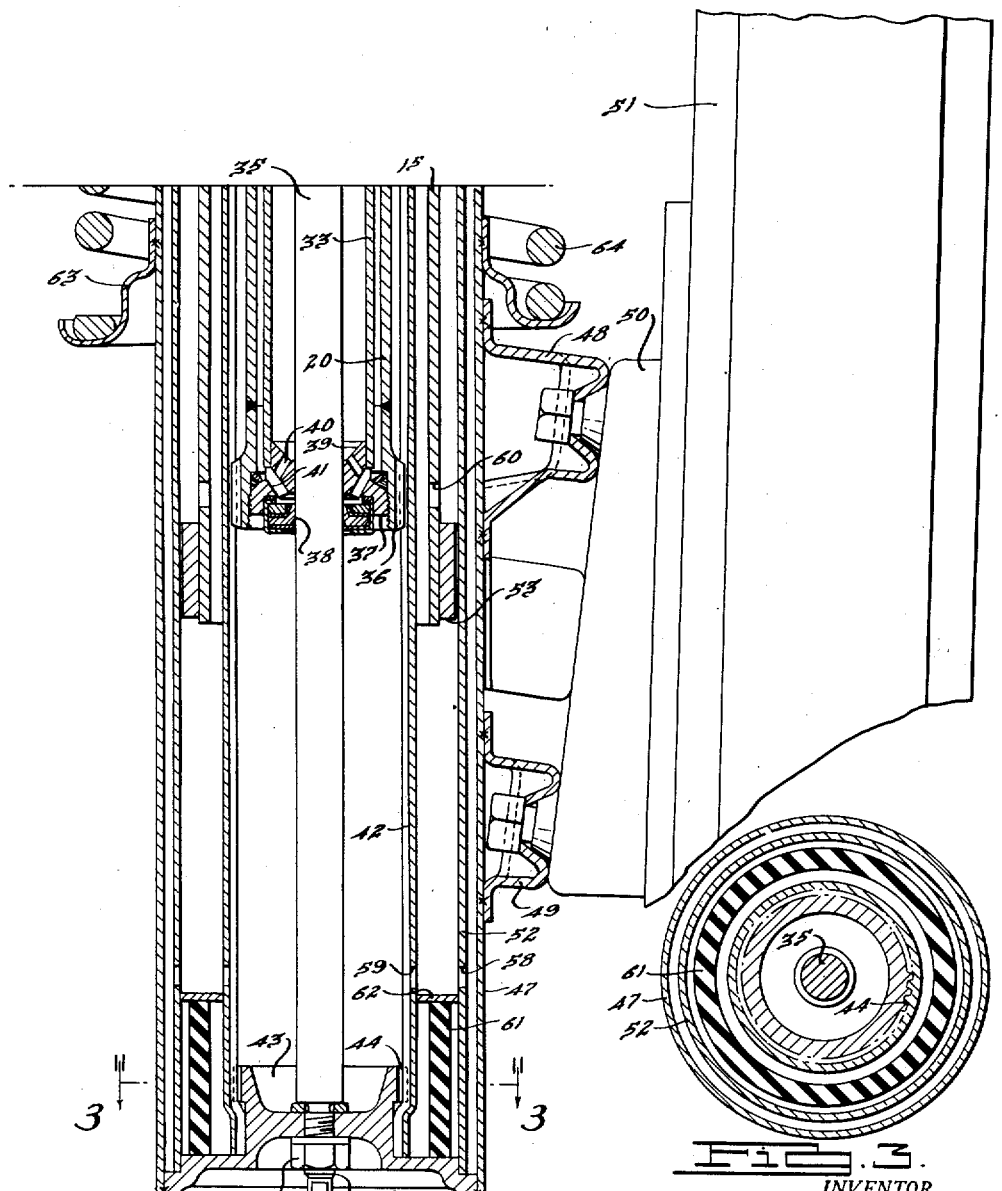
INVENTOR.
John P. Butterfield.
BY
Harness and Harris
ATTORNEYS Patented Sept. 4, 1951

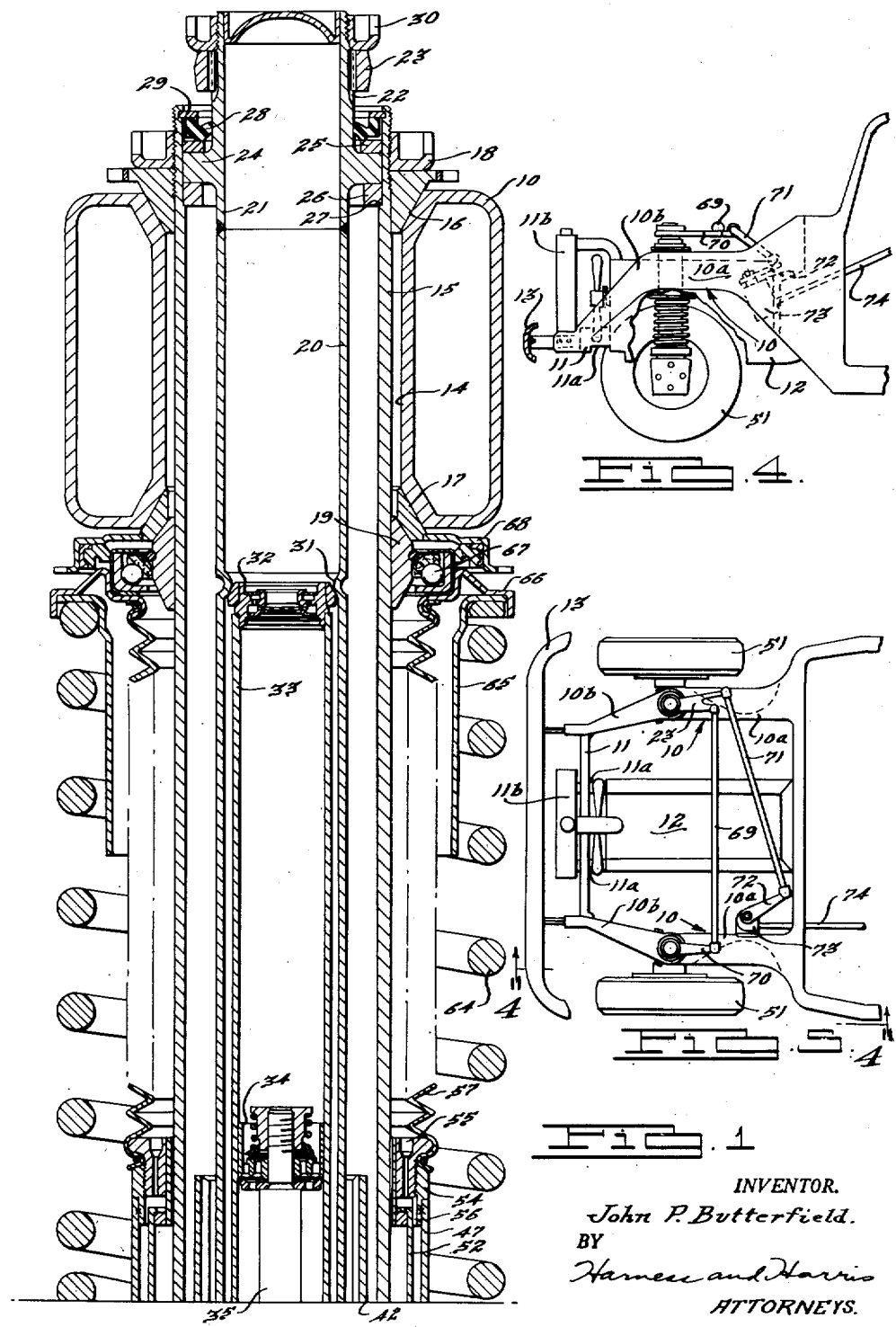

2,567,144

UNITED STATES PATENT OFFICE 2,567,144

SUSPENSION FOR STEERABLE WHEELS

John P. Butterfield, Highland Park, Mich., assignor to Chrysler Corporation, Highland Park, Mich., a corporation of Delaware Application March 1, 1947, Serial No. 731,790

8 Claims. (Cl. 280—96.2)

This application relates to a vehicle suspension. More specifically it relates to a steerable-wheel suspension for a self-propelled vehicle.

In a small automobile it is difficult to fit the indispensable parts within the available space. I have sought to solve this problem by arranging the engine between frame members and mounting the steerable wheels in these frame members. In rearranging the vehicle parts in this way I have made several inventive discoveries involving the mounting of the steerable wheels and the location of the steering mechanism for these wheels.

An object of the present invention is to provide improvements in a suspension for steerable wheels of a vehicle. This may involve the association of shock absorbers with the suspension.

A further object is the provision of an improved arrangement of control mechanism for steerable vehicle wheels. This may involve a novel relation of the steering mechanism to the engine of the vehicle.

Other objects will appear from the disclosure.

In the drawings:

Fig. 1 is a sectional view of the upper portion of the novel suspension of the present invention;

Fig. 2 is a sectional view of the lower portion of the suspension;

Fig. 3 is a sectional view taken on the line 3—3 of Fig. 2;

Fig. 4 is a side view of the front end of an automotive vehicle to which the suspension has been applied; and Fig. 5 is a plan view of what is shown in Fig. 4.

Reference character 10 designates longitudinally extending frame members adjacent the front end of an automotive vehicle. As seen in Fig. 4 each frame member 10 has a high horizontal portion 10<sup>a</sup> approximately at the level of the top of an engine 12 and another portion 10<sup>b</sup> sloping forwardly and downwardly to form a support for a bumper 13. A transverse member 11 is carried by the ends of the beams 10 and supports the front end of the engine 12 by means of pieces 11<sup>a</sup>. The transverse member 11 also supports a radiator 11<sup>b</sup>. As seen in Fig. 1, each frame member 10 has an opening 14 in which is positioned a novel suspension unit of the present invention. The suspension unit includes a tube 15 mounted in the opening 14 by means of frusto-conical members 16 and 17 which engage appropriately-shaped portions of the opening 14. The member 16 is held in engagement with the frame member 10 by means of a nut 18 threaded on the upper end of the tube 15. A ring 19 shrunk on the tube 15 holds the conical member 17 against the opening 14. Thus the tube 15 is held against axial and rotative movement with respect to the frame member 10. A cylinder assembly formed of an inner cylinder 33 and a surrounding cylinder 20 is positioned within the tube 15. This cylinder assembly has an upper section 21 welded to the remainder of the cylinder 20, the upper section being splined as indicated at 22 so as to be non-rotatably engaged by a steering arm 23. The cylinder section 21 has an outwardly extending flange 24 held between bearing rings 25 and 26. The bearing ring 26 fits within the tube 15 against a shoulder 27 formed therein. The bearing ring 25 is held against the flange 24 by means of a rubber seal 28 and a retaining ring 29. The mounting of the cylinder 20 of the cylinder assembly by its flange 24 between the rings 25 and 26 holds the cylinder assembly against axial movement with respect to the tube 15 and the frame member 10 while permitting rotational movement of the cylinder 20. A nut 30 retains the steering arm 23 in splined engagement with the upper end of the cylinder 20.

The cylinder 20 has at an intermediate region an inwardly pressed section 31 forming a flange that is engaged by a compression valve 32. The inner cylinder 33 positioned within the cylinder 20 to form the cylinder assembly, forms a shock absorber cylinder proper and has its upper end engaging the compression valve 32. The valved shock absorber piston 34 is slidably mounted in the cylinder 33. The piston rod 35 has a reduced end in threaded securement with the piston 34. At the lower end of the cylinder assembly is an externally splined fitting 36 welded to the main portion of the cylinder 20. A fitting 37 has threaded engagement with the fitting 36 and embraces the piston rod 35. A seal 38 carried by the fitting 37 closely engages the piston rod 35. The details of the compression valve 32 and the valve structure in the piston 34 carry no reference characters, but it is to be stated that the valve structure in the piston 34 is so arranged that, for example, it will pass fluid downwardly through the piston upon upward travel thereof at a relatively low pressure and pass fluid upwardly at a relatively high pressure. The same thing is true of the compression valve 32. The fitting 37 has a conical recess 39 immediately surrounding the piston rod 35 and there is access for fluid in this recess and in the space between the piston rod and the inner cylinders 33 to the annular space between the cylinders 33 and 20 of the cylinder assembly by way of passages 40 and 41 formed in the fitting 37. In this way fluid trapped below the piston 34 may pass at a relatively low pressure through the fitting 37 to the space between the cylinders 20 and 33 and upwardly around the outer portion of the compression valve 32 into the space in the cylinder 20 above the compression valve. As previously stated, the fitting 36 is externally splined. This fitting has splined engagement with an internally splined tube 42, which engages a splined portion 44 on a base 43. The base 43 engages a reduced threaded end 45 upon the piston rod 35 and is secured to the piston rod by means of a nut 46.

An outer sleeve 47 is secured to the base 43 and extends upwardly therefrom. Brackets 48 and 49 are secured to the outer sleeve 47, and a supporting member 50 for a steerable wheel 51 is secured to the brackets. An intermediate sleeve 52 is secured to the base 43 and extends upwardly therefrom within the outer sleeve 47 in closely spaced relation thereto. The intermediate sleeve 52 may be termed a bearing sleeve, for its inner surface forms a bearing for a collar 53 secured to the lower end of the tube 15. A fitting 54 is secured to the upper ends of the sleeves 47 and 52 and has sliding engagement with the tube 15. The fitting 54 has passages 55 and 56 providing for escape of fluid from the tube 15 and a bellows seal 57 into the space between the sleeves 47 and 52. Openings 58 in the wall of the intermediate sleeve 52 provide for passage of fluid from the space between the sleeve 52 and 47 to the space between the sleeves 42 and 52. Openings 59 in the inner sleeve 42 provides for escape of fluid from within the sleeve 42 to the space between the sleeves 42 and 52. Openings 60 in the tube 15 permit the escape of fluid from the space between the tube 15 and the sleeve 52 to the space between the sleeves 42 and 52.

Separate sleeves 47 and 52 rather than a single sleeve are provided, because they must jointly provide an outer surface to which parts such as the brackets 48 and 49 must be welded and an inner bearing surface on which the ring 53 may slide. If there were only a single sleeve, welding of parts to the outer surface of the sleeve would distort the sleeve so as to prevent the use of the inner surface thereof as a bearing surface.

The piston 34, the rod 35, the base 43, and the sleeves 42, 47, and 52 form a wheel-carrying unit that may move axially, i. e., up and down, with respect to the frame member 10, tube 15, and the cylinder 20. The splined connection of the fitting 36 on the lower end of the cylinder 20 with the inner sleeve 42 assures conjoint rotation of the cylinder 20 and the wheel-carrying unit with respect to the frame 10 and the tube 15. A wide rubber ring 61 and a thin metallic ring 62 mounted on the base 43 in the space between the sleeves 42 and 52 constitute a resilient bumper for the lower end of the tube 15. A ring-like bracket 63 secured to the exterior of the outer sleeve 47 receives the lower end of a coil spring 64 having an upper end engaging a guard 65 which in turn engages a flanged ring 66 associated with the upper end of the bellows seal 57. The flanged ring 66 engages a roller bearing 67 held against the ring 19 and against a flanged member 68 connected with the conical member 17.

It is important to note that the steerable wheel 51 is carried on the outer sleeve 47 or, more generally, on an outer sleeve unit comprising the sleeves 47 and 52. Consequently, the bearings for the sleeve unit and wheel, namely, the ring 53 engaging the bearing sleeve 52 and the fitting 54 engaging the sleeve 15, are relatively low, and thus the bearing loads are relatively low. Note that the bearing 53 in the position of Fig. 2 is generally at the level of the axis of the steerable wheel 51.

Rotative movement of the cylinder 20 and the wheel-carrying unit for the purpose of steering the wheel 51 is effected through the arm 23 splined to the upper end of the cylinder 20. As seen in Fig. 5, the steering arm 23 is bifurcated, being connected by one branch through a rod 69 with a simple steering arm 70 connected to the cylinder and wheel-carrying unit for the other wheel 51. The other branch of the steering arm 23 is connected by means of a rod or link 71 with an arm 72 associated with a gear box 73 that may include a worm and a worm wheel for connecting the arm 72 with a steering rod 74 leading to a conventional wheel, not shown, normally positioned in the driver's compartment of the automotive vehicle. It will be observed from Fig. 4 that the rods 69 and 71 and the steering arms 23 and 70 are positioned above the engine 12. Thus the engine may be kept at a low level in conformance with space requirements of a small vehicle. Hence, the steerable wheels 51 are suspended from the frame members 10 by the suspension and steering units such as shown in Fig. 1. It is possible for the steering arms 23 and 70 and the links 69 and 71 to be above the engine as previously mentioned. It is important that the portions of the frame members 10 to which the suspension units of Fig. 1 extend are approximately at the level of the top of the engine 12 or in other words, are high, for thus the required coil spring 64 may be appropriately fitted between the frame members and the wheels 51.

The intention is to limit the invention only within the scope of the appended claims.

I claim:

1. In a vehicle, the combination with a body and a steerable wheel; of a tube mounted on the body; an hydraulic shock absorber comprising a first part mounted in the tube for a rotary movement and against axial movement and a second part movable with respect to the said first part; an assembly connected to the steerable wheel and comprising a base connected to the said second shock absorber part, an outer sleeve receiving and journalling the tube, and an inner sleeve keyed to the said first shock absorber part so as to provide for axial movement of the assembly and wheel with respect to the body and tube and conjoint rotary movement of the assembly, the wheel, and the first shock absorber part with respect to the body; and resilient means associated with the tube and the steerable wheel-connected assembly urging the wheel assembly and the wheel axially of the tube in all positions of rotary movement of said assembly.

2. In a vehicle, the combination with a frame and a steerable wheel; of a tube projecting through and fixed to the frame; a cylinder assembly having radially spaced inner cylindrical walls and being mounted at one end in the tube so as to be held against axial movement and to be permitted rotary movement and having its other end externally splined; a valve mounted in the cylinder assembly at an intermediate region; a wheel-connected assembly comprising a base, an outer sleeve secured to the base and slidably journalling the tube, a wheel-mounting part secured to the outer sleeve, a piston rod secured to the base, means in the said other end of the cylinder assembly engaging the piston rod in sliding sealing relation, a valved piston secured to the rod and closely fitting one of said cylinder walls, and an inner sleeve secured to the base and having an internal spline engaging the externally splined end of the cylinder assembly so as to permit the wheel-connected assembly to have axial movement relative to the cylinder assembly and frame and joint rotary movement with the cylinder assembly with respect to the tube and frame; a bracket secured to the outer sleeve; and a spring engaging the bracket and the frame so as to urge the wheel-connected assembly axially with respect to the tube and the frame in all positions of rotary movement of said assembly.

3. A shock absorber comprising an inner sleeve, a valve piston slidably mounted in the inner sleeve, a rod having one end attached to the piston and the other end out of the inner sleeve and beyond one end thereof, an intermediate sleeve surrounding the inner sleeve in spaced relation thereto, with one end of the intermediate sleeve adjacent one end of the inner sleeve with the other end of the intermediate sleeve beyond the other end of the inner sleeve, means mounting one end of the intermediate sleeve and the said one end of the inner sleeve and providing a passage between the spaces within the inner sleeve and between the inner and intermediate sleeves and engaging the piston rod in sliding sealing engagement, a valve positioned in the other end of the inner sleeve, an outer sleeve surrounding the intermediate sleeve, means securing the said other end of the piston rod to the outer sleeve, and means splining the intermediate and outer sleeves to one another to prevent relative rotation therebetween and to provide for relative axial movement therebetween.

4. A shock absorber comprising a valved piston, a rod attached to the piston, a cylinder slidably mounting the piston and having an upper portion and a valve engaging the upper portion, said cylinder further having concentric walled structure defining an annular space extending from the valve to one end of the cylinder, a restriction-forming portion at the said one end receiving in the restriction thereof the piston rod in sliding sealing relation, and a passage at the said one end connecting the interior of the cylinder and the annular space, a base member secured to a portion of the piston rod outside the cylinder and beyond the said one end thereof, a first sleeve secured to the base member, means splining the first sleeve and said walled structure to provide for relative axial movement therebetween and to prevent relative rotation therebetween, resilient bumper means associated with the base in surrounding relation to the first sleeve, and a second sleeve attached to said walled structure and surrounding the first sleeve so as to be engageable with the resilient bumper means.

5. In a vehicle, the combination with a frame and a steerable wheel; of a tube projecting through and fixed to the frame; a cylinder assembly having radially spaced inner cylindrical walls and being mounted at one end in the tube so as to be held against axial movement and to be permitted rotary movement and having its other end externally splined; a valve mounted in the cylinder assembly at an intermediate region; a wheel-connected assembly comprising a base, an outer sleeve secured to the base, a wheel-mounting part secured to the outer sleeve, an intermediate sleeve secured to the base within the outer sleeve and slidably journalling the tube, a piston rod secured to the base, means in the said other end of the cylinder assembly engaging the piston rod in sliding sealing relation, a valved piston secured to the rod and closely fitting one of said cylinder walls, and an inner sleeve secured to the base and having an internal spline engaging the externally splined end of the cylinder assembly so as to permit the wheel-connected assembly to have axial movement relative to the cylinder assembly and frame and joint rotary movement with the cylinder assembly with respect to the tube and frame; a bracket secured to the outer sleeve; and a spring engaging the bracket and the frame so as to urge the wheel-connected assembly axially with respect to the tube and the frame in all positions of rotary movement of said wheel-connected assembly.

6. In a vehicle, the combination with a body and a steerable wheel; of a tube fixed to the body; an hydraulic shock absorber comprising a cylinder assembly mounted in the tube for rotary movement and against axial movement, a valved piston slidably mounted in the cylinder assembly, and a piston rod connected to the piston and projecting from the cylinder assembly; a second assembly connected to the steerable wheel and comprising a base connected to the piston rod, an outer sleeve receiving and journalling the tube; and an inner sleeve keyed to the cylinder assembly so as to provide for movement of the second assembly axially of the cylinder assembly and conjoint rotary movement of the second assembly and the cylinder assembly with respect to the body and the tube; and resilient means associated with the tube and the steerable wheel-connected second assembly acting between the frame and the second assembly to urge the second assembly axially of the cylinder assembly in all positions of rotary movement of said second assembly.

7. In a vehicle, the combination with a frame and a steerable wheel; of a tube projecting through and fixed to the frame; a cylinder assembly having radially spaced inner cylindrical walls and being mounted at one end in the tube so as to be held against axial movement and to be permitted rotary movement and having its other end externally splined; a valve mounted in the cylinder assembly at an intermediate region; a wheel-connected assembly comprising a base, an outer sleeve secured to the base, a wheel-mounting part secured to the outer sleeve, an intermediate sleeve secured to the base within the outer sleeve and slidably journalling the tube, a piston rod secured to the base, means in the said other end of the cylinder assembly engaging the piston rod in sliding sealing relation, a valved piston secured to the rod and closely fitting one of said cylinder walls, and an inner sleeve secured to the base and having an internal spline engaging the externally splined end of the cylinder assembly so as to permit the wheel-connected assembly to have axial movement relative to the cylinder assembly and frame and joint rotary movement with the cylinder assembly with respect to the tube and frame; a bracket secured to the outer sleeve; a spring engaging the bracket and the frame so as to urge the wheel-connected assembly axially with respect to the tube and the frame in all positions of rotary movement of said wheel-connected assembly; and resilient bumper means positioned between the inner and intermediate sleeves adjacent the base and engageable with the end of the tube.

8. In a vehicle, the combination with a frame and a steerable wheel; of a tube projecting through and fixed to the frame; a cylinder assembly having radially spaced inner cylindrical walls and being mounted at one end in the tube so as to be held against axial movement and to be permitted rotary movement and having its other end externally splined; a valve mounted in the cylinder assembly at an intermediate region; a wheel-connected assembly comprising a base, an outer sleeve secured to the base and slidably journalling the tube, a wheel-mounting part secured to the outer sleeve, a piston rod secured to the base, means in the said other end of the cylinder assembly engaging the piston rod in sliding sealing relation, a valved piston secured to the rod and closely fitting one of said cylinder walls, and an inner sleeve secured to the base and having an internal spline engaging the externally splined end of the cylinder assembly so as to permit the wheel-connected assembly to have axial movement relative to the cylinder assembly and frame and joint rotary movement with the cylinder assembly with respect to the tube and frame; a bracket secured to the outer sleeve; a spring engaging the bracket and the frame so as to urge the wheel-connected assembly axially with respect to the tube and the frame in all positions of rotary movement of said wheel-connected assembly, and resilient bumper means positioned between the inner and outer sleeves adjacent the base and engageable with the end of the tube.

JOHN P. BUTTERFIELD.

REFERENCES CITED

The following references are of record in the file of this patent:

UNITED STATES PATENTS

| Number | Name | Date |
|---|---|---|
| 1,542,511 | Lancia | June 16, 1925 |
| 1,842,273 | Lancia | Jan. 19, 1932 |
| 2,049,963 | Lancia | Aug. 4, 1936 |
| 2,209,804 | Ashley | July 30, 1940 |
| 2,215,751 | Coleman | Sept. 24, 1940 |
| 2,220,254 | Maier | Nov. 5, 1940 |
| 2,304,291 | Wahlberg | Dec. 8, 1942 |
| 2,310,821 | Wimbish | Feb. 9, 1943 |

FOREIGN PATENTS

| Number | Country | Date |
|---|---|---|
| 555,448 | Germany | Mar. 26, 1931 |
| 759,862 | France | Dec. 6, 1933 |